(12) United States Patent
Dutu et al.

(10) Patent No.: US 12,461,684 B2
(45) Date of Patent: Nov. 4, 2025

(54) SCHEDULING PROCESSING-IN-MEMORY TRANSACTIONS

(71) Applicant: Advanced Micro Devices, Inc., Santa Clara, CA (US)

(72) Inventors: Alexandru Dutu, Kirkland, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/148,000

(22) Filed: Dec. 29, 2022

(65) Prior Publication Data
US 2024/0220160 A1 Jul. 4, 2024

(51) Int. Cl.
*G06F 3/06* (2006.01)
*G06F 13/16* (2006.01)

(52) U.S. Cl.
CPC .......... *G06F 3/0659* (2013.01); *G06F 3/0607* (2013.01); *G06F 3/0656* (2013.01); *G06F 3/0658* (2013.01); *G06F 13/1673* (2013.01); *G06F 3/0679* (2013.01)

(58) Field of Classification Search
CPC .................................................... G06F 15/177
See application file for complete search history.

(56) References Cited

U.S. PATENT DOCUMENTS

| | | | |
|---|---|---|---|
| 11,086,815 B1 | 8/2021 | Santan et al. | |
| 11,429,315 B1 | 8/2022 | Pream et al. | |
| 11,934,827 B2 | 3/2024 | Puthoor et al. | |
| 12,041,179 B2 | 7/2024 | Shaw | |
| 2012/0020371 A1 | 1/2012 | Nemawarkar et al. | |
| 2013/0318280 A1 | 11/2013 | Dalal et al. | |
| 2016/0026571 A1 | 1/2016 | Fukuyama | |
| 2016/0276002 A1 | 9/2016 | Lee | |
| 2016/0294058 A1 | 10/2016 | Tunnell et al. | |
| 2017/0060588 A1 | 3/2017 | Choi | |

(Continued)

OTHER PUBLICATIONS

Chu, Michael, et al., "High-level Programming Model Abstractions for Processing in Memory", [retrieved Oct. 16, 2022]. Retrieved from the Internet <https://www.cs.utah.edu/wondp/wondp-pim-hlm-final.pdf>., 2013, 4 Pages.

(Continued)

*Primary Examiner* — Henry Tsai
*Assistant Examiner* — Juanito C Borromeo
(74) *Attorney, Agent, or Firm* — FIG. 1 Patents

(57) ABSTRACT

Scheduling processing-in-memory transactions is described. In accordance with the described techniques, a memory controller receives a transaction header from a host, where the transaction header describes a number of operations to be executed by a processing-in-memory component as part of performing the transaction. The memory controller adds the transaction header to a buffer and sends either an acknowledgement message or a negative acknowledgement message to the host, based on a current load of the processing-in-memory component. The acknowledgement message causes the host to send operations of the transaction for execution by the processing-in-memory component and the negative acknowledgement message causes the host to refrain from sending the operations of the transaction for execution by the processing-in-memory component.

20 Claims, 4 Drawing Sheets

(56) References Cited

U.S. PATENT DOCUMENTS

| | | | |
|---|---|---|---|
| 2019/0041952 A1 | 2/2019 | Alameldeen et al. | |
| 2020/0389402 A1* | 12/2020 | Goyal | H04L 47/12 |
| 2022/0011939 A1 | 1/2022 | Singh et al. | |
| 2022/0114270 A1 | 4/2022 | Wang et al. | |
| 2022/0206869 A1 | 6/2022 | Ramachandran et al. | |
| 2022/0342551 A1 | 10/2022 | Bora et al. | |
| 2023/0099163 A1* | 3/2023 | Chu | G06F 15/7821 712/34 |
| 2023/0418474 A1* | 12/2023 | Kim | G06F 3/0673 |
| 2024/0211256 A1 | 6/2024 | Puthoor et al. | |
| 2024/0419330 A1 | 12/2024 | Dutu et al. | |

OTHER PUBLICATIONS

Lockerman, Elliot, et al., "Livia: Data-Centric Computing Throughout the Memory Hierarchy", Proceedings of the Twenty-Fifth International Conference on Architectural Support for Programming Languages and Operating Systems [retrieved Oct. 16, 2022]. Retrieved from the Internet <https://people.csail.mit.edu/sanchez/papers/2020.livia.asplos.pdf>., Mar. 13, 2020, 17 Pages.

Pattnaik, Ashutosh, et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

U.S. Appl. No. 17/135,209, "Non-Final Office Action", U.S. Appl. No. 17/135,209, Jul. 7, 2023, 34 pages.

Aguilera, Paula, et al., "Fine-Grained Task Migration for Graph Algorithms Using Processing in Memory", 2016 IEEE International Parallel and Distributed Processing Symposium Workshops (IPDPSW) [retrieved Aug. 10, 2023]. Retrieved from the Internet <https://doi.org/10.1109/IPDPSW.2016.205>, May 2016, 10 pages.

Draper, Jeff, et al., "The Architecture of the DIVA Processing-In-Memory Chip", ICS '02: Proceedings of the 16th International conference on Supercomputing [retrieved Aug. 10, 2023]. Retrieved from the Internet <https://doi.org/10.1145/514191.514197>, Jun. 2002, 12 pages.

Dutu, Alexandru, et al., "US Application as Filed", U.S. Appl. No. 18/211,544, filed Jun. 19, 2023, 59 pages.

Zois, Vasileios, et al., "Massively Parallel Skyline Computation For Processing-In-Memory Architectures", PACT 18: Proceedings of the 27th International Conference on Parallel Architectures and Compilation Techniques [retrieved Aug. 10, 2023]. Retrieved from the Internet <https://doi.org/10.1145/3243176.3243187>, Nov. 1, 2018, 12 pages.

U.S. Appl. No. 17/135,209, "Final Office Action", U.S. Appl. No. 17/135,209, Feb. 1, 2024, 44 pages.

Hall, Mary W, et al., "Memory Management in a PIM-Based Architecture", IMS '00: Revised Papers from the Second International Workshop on Intelligent Memory Systems, Nov. 2000, 18 pages.

U.S. Appl. No. 17/135,209, "Non-Final Office Action", U.S. Appl. No. 17/135,209, Sep. 10, 2024, 35 pages.

U.S. Appl. No. 18/211,544, "Non-Final Office Action", U.S. Appl. No. 18/211,544, Sep. 28, 2024, 19 pages.

Puthoor, Sooraj, et al., "US Application as Filed", U.S. Appl. No. 18/601,006, filed Mar. 11, 2024, 30 pages.

"Final Office Action", U.S. Appl. No. 17/135,209, Apr. 24, 2025, 40 pages.

"Final Office Action", U.S. Appl. No. 18/211,544, Apr. 10, 2025, 27 pages.

"Non-Final Office Action", U.S. Appl. No. 18/211,544, filed Sep. 29, 2025, 20 pages.

* cited by examiner

SCHEDULING PROCESSING-IN-MEMORY TRANSACTIONS

BACKGROUND

Processing-in-memory (PIM) architectures move processing of memory-intensive computations to memory. This contrasts with standard computer architectures which communicate data back and forth between a memory and a processing unit. In terms of data communication pathways, processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the processing unit is large. Thus, processing-in-memory architectures enable increased computer performance while reducing data transfer latency as compared to conventional computer architectures that implement processing hardware outside of, or far from, memory.

DETAILED DESCRIPTION

Overview

Figure 1:
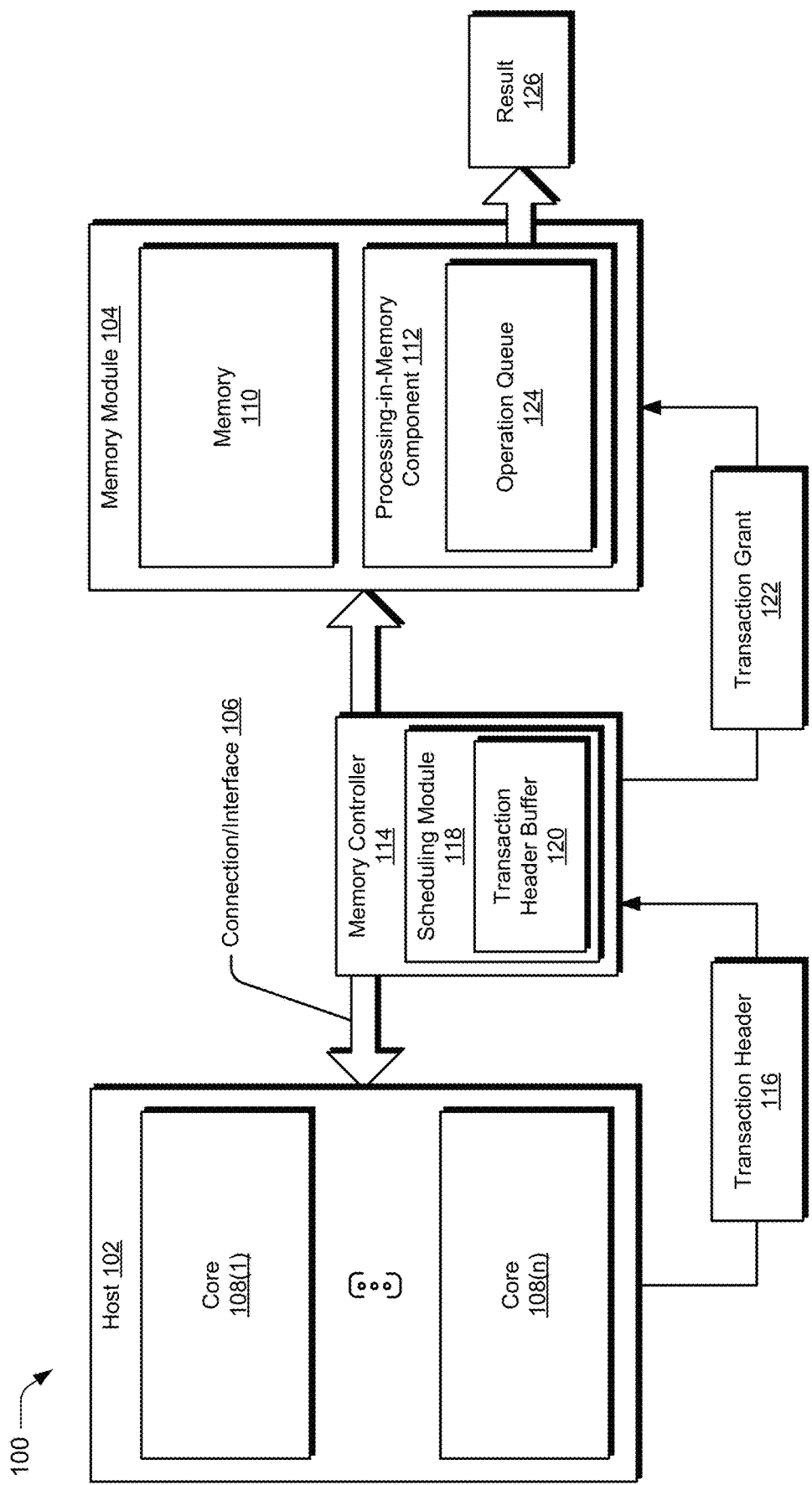
FIG. 1 is a block diagram of an example system having a host with at least one core, a memory module with a memory and a processing-in-memory component, and a memory controller.

Computer architectures with PIM components implement processing devices embedded in memory hardware (e.g., memory chips). By implementing PIM components in memory hardware, PIM architectures are configured to provide memory-level processing capabilities to a variety of applications, such as applications executing on a host processing device that is communicatively coupled to the memory hardware. In such implementations where the PIM component provides memory-level processing for an application executed by the host processing device, the host processing device controls the PIM component by dispatching one or more application operations for performance by the PIM component. In some implementations, the host processing device tasks the PIM component with executing a transaction, which includes multiple operations that must be performed sequentially and without interruption by the PIM component. In conventional computer architectures that do not implement PIM components, a host processing device executing operations that would otherwise be offloaded to a PIM component places a lock on data stored in memory that is processed as part of executing the operations.

In scenarios where the locked memory is shared by one or more different processing devices, other requests to access data stored at locked memory addresses are denied, which causes a requesting host to abort and restart a denied request. Conventional architectures thus force host processing devices to repeatedly request access to locked memory addresses until a lock is remove and access is granted. In high contention scenarios where numerous host processing devices request access to a common memory address, traffic on communication interfaces that connect the hosts to memory increases, unduly increasing memory bus traffic and often creating a bottleneck that results in computing system inefficiencies. Further, repeatedly transmitting aborted requests unnecessarily consumes processing resources and associated power.

To address these conventional problems, scheduling processing-in-memory transactions is described. In implementations, a system includes a memory module having a memory and a PIM component. The memory module is communicatively coupled to at least one core of at least one host, such as a core of a host processor. The system further includes a memory controller, such as a memory controller implemented locally at a host processor, a memory controller implemented at the memory module, or a memory controller implemented separate from a host processor and separate from the memory module. In implementations, the memory controller implements a scheduling module that is configured to schedule requests made by one or more host cores for the PIM component to execute operations on behalf of the one or more host cores using data stored in the memory.

To efficiently schedule requests for performing PIM transactions, the memory controller receives a transaction header for each PIM component request. Each transaction header includes information that describes a task identifier for the transaction, a source identifier associated with a host that requested the transaction, and at least one address for a location in the memory that includes data to be processed as part of performing the transaction. Each transaction header further includes information describing a number of operations that are to be executed by the PIM component as part of performing the transaction. In implementations, a transaction including multiple operations requires that the multiple operations be performed atomically (i.e., performed sequentially and without interruption by the PIM component performing an operation not involved in the transaction). In some implementations, the transaction header further describes priority information for the transaction.

The scheduling module of the memory controller includes a transaction header buffer, which is configured to maintain a list of transaction headers received at by the memory controller. In some implementations, PIM transaction requests are serviced by the memory controller on a first in, first out (FIFO) basis, where transaction headers are organized in the transaction header buffer based on an order in which the transaction headers were temporally received from one or more host cores. Alternatively or additionally, the memory controller is configured to order (i.e., prioritize) transaction headers in the transaction header buffer based on priority information associated with respective transaction headers, such that higher-priority transaction headers are serviced before lower-priority transaction headers.

Using memory address information associated with different transaction headers, the memory controller is configured to detect conflicts that would otherwise arise from simultaneously executing different PIM transactions that involve processing data stored at a common address in memory. Requests for non-conflicting transactions (e.g., transactions that involve processing data stored at separate, non-overlapping addresses in memory) are granted and enqueued for execution by the PIM component. Conversely, requests for conflicting transactions (e.g., different transactions that require processing data stored in at least one common memory address location) are arbitrated and individually granted by the memory controller.

When granting a transaction request, the memory controller sends an acknowledgement message to a host associated with the source identifier described in the transaction header for the transaction request being granted. This acknowledgement message causes the receiving host to send operations of the transaction for execution by the PIM component. In some implementations, the host transmits the transaction operations to the PIM component by way of the memory controller (e.g., the memory controller routes the transaction operations from the host core to the PIM component). Alternatively or additionally, the host transmits the transaction operations directly to the PIM component (e.g., independent of routing one or more of the transaction operations to the PIM component via the memory controller).

The PIM component includes an operation queue, which is used to enqueue operations of granted transaction requests for sequential execution. In some implementations, the memory controller is configured to monitor the operation queue of the PIM component and identify a number of available slots for enqueueing transaction operations. In such implementations, the memory controller is configured to abstain from granting transaction requests until the PIM component operation queue has space (e.g., includes sufficient available slots) to enqueue operations of a requested transaction. The PIM component is configured to execute enqueued operations and generate one or more results as part of performing a transaction, by processing data stored in memory at one or more memory addresses defined by the transaction header for the transaction.

Conversely, upon detecting that a conflict exists for a requested transaction (e.g., where a received transaction header indicates that data stored at a memory address currently being utilized by a PIM component is required to perform a transaction), the memory controller sends a negative acknowledgment message to a requesting host and buffers the transaction header. By buffering the transaction header, the memory controller is configured to generate the negative acknowledgement message in a manner that instructs the requesting host to refrain from sending operations of the transaction for execution by the PIM component. The memory controller is further configured to generate the negative acknowledgement message in a manner that instructs the requesting host to refrain from subsequently requesting performance of the transaction (e.g., sending another transaction header for the transaction to the memory controller). The requesting host thus waits for the memory controller to send an acknowledgment message (e.g., in response to the memory controller detecting that the PIM component has completed executing a conflicting transaction, detecting that the PIM component operation queue has space to enqueue transaction operations, and so forth) and advantageously avoids sending repeated transaction requests that would be denied, as required by conventional computing architectures.

Alternatively, in some implementations, the memory controller generates a negative acknowledgement message that includes a retry interval, which specifies an amount of time for a requesting host to wait before again requesting performance of the transaction (e.g., before sending another transaction header to the memory controller). In implementations, the memory controller is configured to compute the retry interval based on a current and/or future scheduled load to be processed by the PIM component. For instance, the memory controller is configured to consider a number of operations described by transaction headers maintained in a transaction header buffer, a number of operations enqueued in a PIM component operation queue, or a combination thereof and compute an estimated time to complete execution of the operations.

In contrast to conventional computing architectures, the techniques described herein enable conflict-free scheduling of PIM transactions without implementing locks on data maintained at one or more addresses memory, thereby avoiding computational costs incurred by setting and releasing memory locks (e.g., computation, interconnect/memory bandwidth required to set and check memory locks). As a further advantage relative to conventional systems, the techniques described herein enable scheduling PIM transactions without requiring that a requesting host abort a transaction request when the transaction cannot be serviced when the transaction request is received at the memory controller.

Although described with respect to a single PIM component, the techniques described herein are configured for implementation by multiple processing-in-memory components in parallel (e.g., simultaneously). For instance, in an example scenario where memory is configured as DRAM, a processing-in-memory component is included at each hierarchical DRAM component (e.g., channel, bank, array, and so forth). The memory controller is configured to buffer transaction headers and grant transaction requests on a per-PIM component basis, such that transaction requests involving data stored at different hierarchical DRAM components are identified as non-conflicting and granted accordingly. Conversely, transaction headers indicating that different transactions involve processing data stored at a common DRAM address are buffered and arbitrated to grant access in a non-conflicting manner.

By utilizing a PIM component to perform a transaction, the described techniques do not create additional traffic on an interface between a memory module implementing the PIM component and the memory controller or a host processor requesting performance of the transaction. By executing transactions using PIM, the described techniques further advantageously save cycles of the host processor, which reduces system power consumption and frees the host processor to perform additional operations relative to conventional systems.

In some aspects, the techniques described herein relate to a system including a memory of a memory module, a processing-in-memory component of the memory module, and a memory controller configured to receive a transaction header for a transaction to be executed by the processing-in-memory component using data stored in the memory, add the transaction header to a transaction header buffer, and send an acknowledgement message to a host from which the transaction header was received that causes the host to send operations of the transaction for execution by the processing-in-memory component, or send a negative acknowledgment message to the host that causes the host to refrain from sending the operations of the transaction for execution by the processing-in-memory component.

In some aspects, the techniques described herein relate to a system, wherein the transaction header describes a number of the operations of the transaction to be executed by the processing-in-memory component.

In some aspects, the techniques described herein relate to a system, wherein execution of the transaction includes the processing-in-memory component executing the operations of the transaction sequentially without interruption.

In some aspects, the techniques described herein relate to a system, wherein the transaction header describes priority information for the transaction.

In some aspects, the techniques described herein relate to a system, wherein the transaction header describes one or more addresses in the memory at which the data stored in the memory is located.

In some aspects, the techniques described herein relate to a system, wherein the transaction header describes a task identifier associated with the transaction and a source identifier associated with the host from which the transaction header was received.

In some aspects, the techniques described herein relate to a system, wherein the transaction header buffer includes a buffer maintained at the memory controller.

In some aspects, the techniques described herein relate to a system, wherein the transaction header buffer includes a buffer maintained in the memory of the memory module.

In some aspects, the techniques described herein relate to a system, wherein the memory controller is implemented in the host and the transaction header is received from a core of the host.

In some aspects, the techniques described herein relate to a system, wherein the acknowledgement message causes the host to send the operations of the transaction to the memory controller for routing to the processing-in-memory component.

In some aspects, the techniques described herein relate to a system, wherein the acknowledgement message causes the host to send the operations of the transaction directly to the processing-in-memory component.

In some aspects, the techniques described herein relate to a system, wherein the memory controller is configured to send the acknowledgement message to the host in response to identifying that the processing-in-memory component is not scheduled to execute one or more operations using data stored in memory at an address associated with the transaction.

In some aspects, the techniques described herein relate to a system, wherein the memory controller is configured to send the acknowledgment message to the host in response to identifying that an operation queue of the processing-in-memory component has space to queue the operations of the transaction.

In some aspects, the techniques described herein relate to a system, wherein the memory controller is configured to send the negative acknowledgment message to the host with a retry interval that indicates an amount of time to wait before subsequently requesting that the transaction be executed by the processing-in-memory component.

In some aspects, the techniques described herein relate to a system, wherein the memory controller is configured to compute the retry interval based on a load described by one or more transaction headers maintained in the transaction header buffer.

In some aspects, the techniques described herein relate to a system, wherein the memory controller is configured to compute the retry interval based on a load described by one or more transaction operations enqueued in an operation queue of the processing-in-memory component.

In some aspects, the techniques described herein relate to a system, wherein the negative acknowledgement message causes the host to refrain from sending the operations of the transaction for execution by the processing-in-memory component until receiving a subsequent acknowledgement message from the memory controller.

In some aspects, the techniques described herein relate to a system, wherein the acknowledgement message causes the host to send operations of the transaction for execution by the processing-in-memory component without locking one or more locations in the memory of the memory module.

In some aspects, the techniques described herein relate to a method including receiving, at a memory controller and from a host processing device, a transaction header for a transaction to be executed by a processing-in-memory component of a memory module, the transaction header describing a number of operations involved in executing the transaction, maintaining, by the memory controller, the transaction header in a buffer; monitoring, by the memory controller, an operation queue of the processing-in-memory component and identifying a number of open spaces in the operation queue, and sending, by the memory controller, an acknowledgment message to the host processing device that causes the host processing device to transmit the operations involved in executing the transaction to the processing-in-memory component responsive to determining that the number of open spaces in the operation queue can fit the number of operations involved in executing the transaction.

In some aspects, the techniques described herein relate to a system including a memory of a memory module, a processing-in-memory component of the memory module, and a memory controller configured to: receive a transaction header from a host for a transaction to be executed by the processing-in-memory component using data stored in the memory and add the transaction header to a transaction header buffer, determine that the processing-in-memory component is unable to execute the transaction based on a current load of the processing-in-memory component, compute a retry interval based on the current load of the processing-in-memory component, and send a negative acknowledgement message to the host that causes the host to refrain from subsequently requesting that the processing-in-memory component perform the transaction until after the retry interval.

FIG. 1 is a block diagram of a system 100 that includes a host with at least one core, a memory module with a memory and a PIM component, and a memory controller configured to grant requests by the host for the PIM component to perform transactions. In particular, the system 100 includes host 102 and memory module 104, where the host 102 and the memory module 104 are communicatively coupled via connection/interface 106. In one or more implementations, the host 102 includes at least one core 108. In some implementations, the host 102 includes multiple cores 108. For instance, in the illustrated example of FIG. 1, host 102 is depicted as including core 108(1) and core 108(n), where n represents any integer. The memory module 104 includes memory 110 and processing-in-memory component 112.

In accordance with the described techniques, the host 102 and the memory module 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or a core 108 of the host include, but are not limited to, a central processing unit (CPU), a graphics processing unit (GPU), a field programmable gate array (FPGA), an accelerated processing unit (APU), and a digital signal processor (DSP). For example, in one or more implementations a core 108 is a processing unit that reads and executes instructions (e.g., of a program), examples of which include to add data, to move data, and to branch data.

In one or more implementations, the memory module 104 is a circuit board (e.g., a printed circuit board), on which the memory 110 is mounted and includes the processing-in-memory component 112. In some variations, one or more integrated circuits of the memory 110 are mounted on the circuit board of the memory module 104, and the memory module 104 includes one or more processing-in-memory components 112. Examples of the memory module 104 include, but are not limited to, a TransFlash memory module, a single in-line memory module (SIMM), and a dual in-line memory module (DIMM). In one or more implementations, the memory module 104 is a single integrated circuit device that incorporates the memory 110 and the processing-in-memory component 112 on a single chip. In some examples, the memory module 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device (e.g., by a core 108 of the host 102 and/or by the processing-in-memory component 112). In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM).

In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or additionally, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways that support memory verification (e.g., of the memory 110) using processing-in-memory without departing from the spirit or scope of the described techniques.

Broadly, the processing-in-memory component 112 is configured to process processing-in-memory operations involved as part of one or more transactions (e.g., operations of a transaction received from the core 108 via the connection/interface 106). The processing-in-memory component 112 is representative of a processor with example processing capabilities ranging from relatively simple (e.g., an adding machine) to relatively complex (e.g., a CPU/GPU compute core). In an example, the processing-in-memory component 112 processes the one or more transactions by executing associated operations using data stored in the memory 110.

Processing-in-memory contrasts with standard computer architectures which obtain data from memory, communicate the data to a processing unit (e.g., a core 108 of the host 102), and process the data using the processing unit (e.g., using a core 108 of the host 102 rather than the processing-in-memory component 112). In various scenarios, the data produced by the processing unit as a result of processing the obtained data is written back to memory, which involves communicating the produced data over the connection/interface 106 from the processing unit to memory. In terms of data communication pathways, the processing unit (e.g., a core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the processing unit is large, which can also decrease overall computer performance.

Thus, the processing-in-memory component 112 enables increased computer performance while reducing data transfer energy as compared to standard computer architectures that implement processing hardware outside, or further from, the memory. Further, the processing-in-memory component 112 alleviates memory performance and energy bottlenecks by moving one or more memory-intensive computations closer to the memory 110. Although the processing-in-memory component 112 is illustrated as being disposed within the memory module 104, in some examples, the described benefits of memory verification using processing-in-memory are realizable through near-memory processing implementations in which the processing-in-memory component 112 is disposed in closer proximity to the memory 110 (e.g., in terms of data communication pathways) than a core 108 of the host 102.

The system 100 is further depicted as including memory controller 114. The memory controller 114 is configured to receive at least one transaction header 116 from the host 102 (e.g., from a core 108 of the host 102). Although depicted in the example system 100 as being implemented separately from the host 102, in some implementations the memory controller is implemented locally as part of the host 102. The memory controller 114 is further configured to schedule PIM transactions for a plurality of hosts, despite being depicted in the illustrated example of FIG. 1 as serving only a single host 102. For instance, in an example implementation the memory controller 114 schedules PIM transactions for a plurality of different hosts, where each of the plurality of different hosts include one or more cores that transmit a transaction header 116 to the memory controller 114 when requesting a PIM transaction.

In implementations, the transaction header 116 includes information describing a source identifier for a source that generated the transaction header (e.g., a source identifier for a core 108 from which the transaction header 116 was received). The transaction header 116 further includes a task identifier for a transaction requested by a source to be performed by the processing-in-memory component 112. The transaction header 116 further describes at least one address for a location in memory 110 that stores data to be processed by the processing-in-memory component 112 as part of performing the transaction.

The transaction header 116 additionally includes information that describes a number of operations that the source requires the processing-in-memory component 112 to execute as part of performing the transaction. In some implementations where a transaction includes multiple operations, the multiple operations of the transaction are required to be performed atomically by the processing-in-memory component 112, independent of interruption (e.g., without the processing-in-memory component 112 interleaving execution of the transaction operations with execution of one or more operations not involved with the transaction identified by the transaction header 116). In some implementations, the transaction header 116 includes information describing a priority associated with the transaction being requested by the source (e.g., an integer value, a designation of "low," "medium," or "high", or any other suitable information useable by the memory controller 114 to distinguish between transactions of different priorities).

As depicted in the illustrated example of FIG. 1, the memory controller 114 includes a scheduling module 118. The scheduling module 118 is representative of logic configured to efficiently schedule transactions requested by the host 102 for execution by the processing-in-memory component 112 in a manner that avoids scheduling conflicting transactions that attempt to access common locations in memory 110 using techniques described herein. Advantageously, using the techniques described herein, the scheduling module 118 is configured to schedule processing-in-memory transactions in a manner that reduces an amount of times a source needs to request performance of a transaction before execution of the transaction by the processing-in-memory component 112 (e.g., a core 108 of the host 102 need only send a single request to the memory controller 114 for a given processing-in-memory transaction).

To perform the techniques described herein, the scheduling module 118 includes a transaction header buffer 120. The transaction header buffer 120 is configured to maintain a list of transaction headers 116 received by the memory controller 114 from one or more sources (e.g., from one or more cores 108 of host 102, from different host processors, combinations thereof, and so forth). In some implementations, the transaction header buffer 120 prioritizes transaction headers 116 on a FIFO basis, such that transaction headers 116 are ordered in the transaction header buffer 120 based on an order in which they were received by the memory controller 114. In some implementations, the transaction header buffer 120 prioritizes transaction headers 116 based on priority information described in the transaction header 116, such that a transaction identified by a higher-priority transaction header 116 received by the memory controller 114 after a lower-priority transaction header 116 is prioritized for earlier processing by the processing-in-memory component 112.

The memory controller 114 is configured to maintain the transaction header 116 in the transaction header buffer 120 until detecting that the at least one address in memory 110 specified by the transaction header 116 is not being used by the processing-in-memory component 112 or scheduled for use by the processing-in-memory component 112. In this manner, by considering memory address data included in the transaction header 116, the memory controller 114 is configured to identify conflicts that would result from the processing-in-memory component 112 attempting to simultaneously execute different transactions using data stored at a common location in memory 110. In response to detecting that granting the transaction associated with the transaction header 116 does not create a conflict, the memory controller 114 grants permission for the transaction to proceed, represented in the illustrated example of FIG. 1 by transaction grant 122.

Alternatively, in response to detecting that granting a request for the transaction associated with the transaction header 116 would create a conflict, the transaction header 116 is stored in the transaction header buffer 120 and the memory controller 114 refrains from granting the requested transaction until detecting that granting the transaction request would no longer cause a conflict. In some implementations, the memory controller 114 detects that granting a transaction request associated with the transaction header 116 would cause a conflict by identifying that the transaction header 116 specifies an address in memory 110 that is currently being used or scheduled for use by the processing-in-memory component 112 in executing one or more operations. The memory controller 114 is further configured to identify situations where the processing-in-memory component 112 does not have adequate processing resources to service a requested transaction. In response to identifying that the processing-in-memory component 112 does not have enough processing resources to service a requested transaction, the memory controller 114 maintains the transaction header associated with the requested transaction in the transaction header buffer 120.

To determine what addresses in memory 110 are currently being used or scheduled for use by the processing-in-memory component 112, and to identify whether the processing-in-memory component 112 has sufficient processing resources to execute operations of a requested transaction, the memory controller 114 leverages an operation queue 124 of the processing-in-memory component 112. The operation queue 124 is representative of a data storage structure in the processing-in-memory component 112 that maintains an ordered list of operations scheduled for sequential execution by the processing-in-memory component 112 using data stored in memory 110.

Each operation enqueued at the operation queue 124 includes address information that is readable by the memory controller 114 to determine whether data stored at an address in memory 110 is in use or scheduled for use by the processing-in-memory component 112. The memory controller 114 is additionally configured to monitor the operation queue 124 and identify a number of available slots for enqueuing transaction operations. In response to detecting that the operation queue 124 includes an enqueued operation that involves processing data stored at an address in memory 110 and that a pending transaction described by a transaction header 116 in the transaction header buffer 120 also involves processing data stored at the same address in memory 110, the memory controller 114 refrains from granting the pending transaction until after the processing-in-memory component 112 completes execution of the enqueued operation. Similarly, in response to detecting that the operation queue 124 does not contain sufficient slots for enqueuing one or more operations of a pending transaction described by a transaction header 116 in the transaction header buffer 120, the memory controller 114 refrains from granting the pending transaction until the operation queue 124 has enough open slots to enqueue the one or more operations of the pending transaction (e.g., when the operation queue has a number of open spaces that can fit the one or more operations of the pending transaction).

When granting a transaction request, such as a transaction request associated with the transaction header 116, the memory controller 114 generates an acknowledgement message and transmits the acknowledgement message to a requesting source identified by the source identifier in the transaction header 116. Upon receipt of the acknowledgment message, the requesting source (e.g., the host 102) is caused to send operations of the granted transaction for execution by the processing-in-memory component 112.

In some implementations, upon receipt of the acknowledgment message, the host 102 transmits one or more operations of a granted transaction request to the processing-in-memory component 112 via the memory controller 114 (e.g., using the interface 106). Alternatively or additionally, in some implementations the host 102 transmits one or more operations of the granted transaction request directly to the processing-in-memory component 112 (e.g., independent of routing the one or more operations to the processing-in-memory component 112 via the memory controller 114) using the interface 106. In accordance with one or more implementations, the memory controller 114 is configured to generate the acknowledgement message to include instructions communicating transaction instructions to the processing-in-memory component 112 (e.g., via the memory controller 114, directly to the processing-in-memory component 112, a combination thereof, and so forth). Upon receipt of the transaction operations represented in FIG. 1 by the transaction grant 122, the processing-in-memory component 112 adds the transaction operations to the operation queue 124 for processing.

In response to sending an acknowledgment message for a granted transaction request, the memory controller 114 removes the transaction header 116 for the granted transaction request from the transaction header buffer 120. In some implementations, the memory controller 114 removes the transaction header 116 from the transaction header buffer 120 in response to sending the acknowledgement message for the transaction header 116 to the requesting source (e.g., host 102). Alternatively or additionally, the memory controller 114 removes the transaction header 116 from the transaction header buffer 120 in response to receiving confirmation from the requesting source that the transaction operations were sent to the processing-in-memory component 112. Alternatively or additionally, the memory controller 114 removes the transaction header 116 from the transaction header buffer 120 in response to identifying that the transaction operations described by the transaction header 116 are enqueued at the operation queue 124.

Alternatively, in response to detecting that a conflict exists for a requested transaction associated with the transaction header 116, or in response to detecting that the operation queue 124 does not have enough slots to accommodate one or more operations of the requested transaction, the memory controller 114 sends a negative acknowledgment message to the requesting source and maintains the transaction header 116 in the transaction header buffer 120. The negative acknowledgement message instructs the requesting source to not send operations of the requested transaction to the processing-in-memory component 112 for execution.

Further, because the memory controller 114 continues to store the transaction header 116 in the transaction header buffer 120 after sending a negative acknowledgement message to a requesting source, in some implementations the memory controller 114 generates the negative acknowledgement message to instruct the requesting source from again requesting that the memory controller 114 grant the transaction request. In this manner, the memory controller 114 causes the host 102 to not send multiple requests (e.g., multiple transaction headers 116) for a transaction request, even after receiving a negative acknowledgement message, which is not possible using conventional system architectures. Instead, a requesting source is instructed to wait for the memory controller 114 to send an acknowledgement message.

For instance, after sending a negative acknowledgement message for a transaction header 116, the memory controller 114 sends an acknowledgement message to a requesting source in response to detecting that the processing-in-memory component 112 has finished executing a conflicting operation previously included in the operation queue 124. Alternatively or additionally, after sending a negative acknowledgement message for a transaction header 116, the memory controller 114 sends an acknowledgement message to the requesting source in response to calculating that the processing-in-memory component 112 will finished executing all conflicting operations included in the operation queue 124 before executing operations of the requested transaction associated with transaction header 116. Alternatively or additionally, after sending a negative acknowledgement message for a transaction header 116, the memory controller 114 sends an acknowledgement message to the requesting source in response to detecting that the operation queue 124 has enough slots to enqueue one or more transactions of the requested transaction identified by transaction header 116.

Alternatively, in some implementations the memory controller 114 generates and transmits a negative acknowledgement message to a requesting source without adding the transaction header 116 to the transaction header buffer 120. In implementations where the memory controller 114 refuses to grant a requested transaction by sending a negative acknowledgement message without adding the transaction header 116 to the transaction header buffer 120, the memory controller 114 includes a retry interval in the negative acknowledgement message. The retry interval defines a period of time that the requesting source should wait before again requesting that the memory controller 114 grant previously sent transaction request (e.g., before sending another instance of the transaction header 116 to the memory controller 114).

The memory controller 114 is configured to compute a retry interval for a denied transaction header 116 based on a current processing load, a scheduled processing load, or a combination thereof, for the processing-in-memory component 112. For instance, the memory controller 114 is configured to compute a duration for the retry interval based on an estimated time for the processing-in-memory component 112 to finish execution of one or more operations enqueued in the operation queue 124. Alternatively or additionally, the memory controller 114 is configured to compute the duration for the retry interval based on an estimated time for the scheduling module 118 to clear one or more transaction headers from the transaction header buffer 120 (e.g., an estimated time for the scheduling module 118 to grant buffered transaction requests).

In some implementations, the memory controller 114 estimates a time required by the processing-in-memory component 112 to execute a transaction operation based on historic data that describes a measured amount of time used to previously execute the transaction operation, multiple operations of a transaction, an entirety of a transaction, or similar transaction operations. Alternatively or additionally, the memory controller 114 estimates a time required by the processing-in-memory component 112 to execute a transaction operation based on a type of one or more computations involved in executing the transaction operation.

As part of executing a transaction operation, the processing-in-memory component 112 generates a result 126 that includes data generated from processing data stored in the memory 110 during one or more transaction operations. Instructions included in the transaction operation for outputting the result 126 are configurable in a variety of manners. For instance, in some implementations executing a transaction operation causes the processing-in-memory component 112 to communicate the result 126 to a requesting source for the transaction (e.g., the host 102). Alternatively or additionally, in some implementations instructions included in the transaction operation cause the processing-in-memory component 112 to output the result 126 to a storage location in memory 110 (e.g., to update data stored in memory 110, for subsequent access and/or retrieval by the host 102, and so forth). Alternatively or additionally, in some implementations instructions included in the transaction operation cause the processing-in-memory component 112 to store the result 126 locally (e.g., in a register of the processing-in-memory component 112).

Because the processing-in-memory component 112 executes transaction operations on behalf of the host 102, the processing-in-memory component 112 performs the described techniques with minimal impact on the system 100 (e.g., without invalidating caches of the system 100 or causing traffic on the connection/interface 106). For instance, the processing-in-memory component 112 performs data evaluation operations on the memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the processing-in-memory component 112 is closer to the memory 110 than the core 108 of the host 102 in terms of data communication pathways, evaluating data stored in memory 110 is generally completable in a shorter amount of time using the processing-in-memory component 112 than if the evaluation were performed using the core 108 of the host 102.

Further, in contrast to conventional computing architectures, the transaction header buffer 120 of the scheduling module 118 enables the memory controller 114 to handle conflict-free scheduling of transactions executed by the processing-in-memory component 112 without using locks on data maintained at one or more locations in memory 110 (e.g., without using host 102-implemented memory locks). As a further advantage relative to conventional systems, the transaction header buffer 120 of the scheduling module 118 enables the memory controller 114 to schedule transaction operations for execution by the processing-in-memory component 112 independent of (e.g., without) the host 102 repeatedly requesting that the processing-in-memory component 112 perform a same transaction in response to receiving a negative acknowledgement request from the memory controller 114. Further, in implementations where the host 102 repeatedly requests that the processing-in-memory component 112 perform the same transaction, the memory controller 114 leverages information maintained in the transaction header buffer 120 to avoid scheduling duplicate transactions. For instance, based on the source identifier and the task identifier in a transaction header 116, the memory controller 114 avoids adding duplicate transaction headers to the transaction header buffer 120 (e.g., does not buffer a transaction header when the transaction header includes a same source identifier and a same task identifier as a transaction header currently maintained in the transaction header buffer 120).

Figure 2:
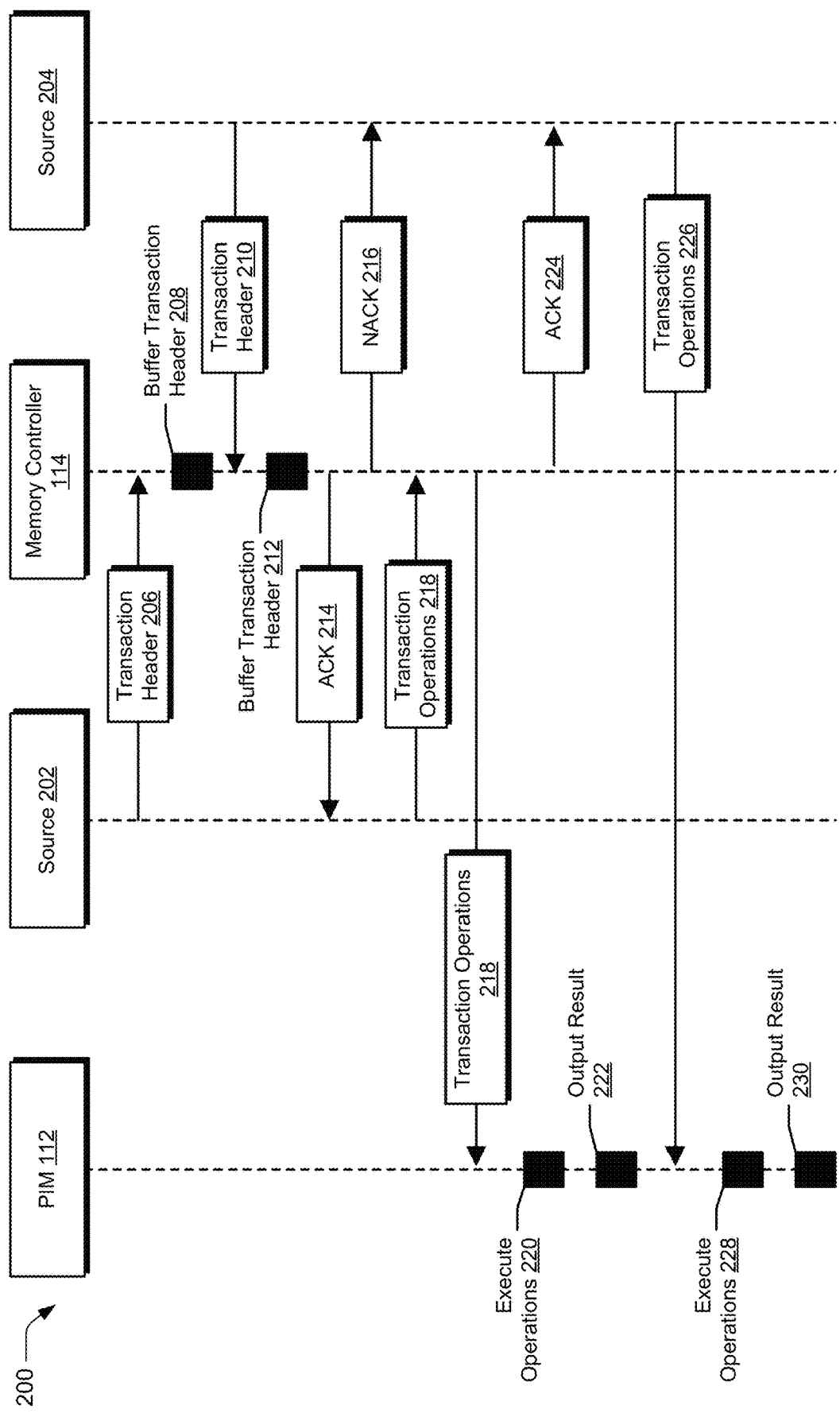
FIG. 2 depicts an example of scheduling processing-in-memory transactions.

FIG. 2 depicts an example 200 of scheduling processing-in-memory transactions.

The example 200 is depicted as including the processing-in-memory component 112 and the memory controller 114. The example 200 is additionally depicted as including a source 202 and a source 204. Example sources of the source 202 and the source 204 include a single host 102, multiple different hosts (e.g., the host 102 and a different host), a single core 108 of the host 102, different cores of the host 102, or combinations thereof. The memory controller 114 is depicted as receiving a transaction header 206 from the source 202, where the transaction header 206 represents an instance of the transaction header 116.

In accordance with one or more implementations, in response to receiving the transaction header 206, the memory controller 114 adds the transaction header 206 to a buffer, such as transaction header buffer 120, as indicated by the buffer transaction header 208 operation block in the illustrated example of FIG. 2. Alternatively, in some implementations, the memory controller 114 does not buffer the transaction header 206. For instance, in some implementations, upon receipt of the transaction header 206 the memory controller 114 identifies that the processing-in-memory component 112 has adequate resources and is not processing or is not scheduled to process a conflicting transaction. In response to identifying adequate PIM resources and a lack of conflicting transaction operations, the memory controller 114 is configured to grant the transaction request associated with the transaction header 206 independent of (e.g., without) adding the transaction header 206 to the transaction header buffer 120. Thus, in some implementations, performance of the functionality represented by the buffer transaction header 208 operation block in the illustrated example of FIG. 2 is optional.

The memory controller 114 is additionally depicted as receiving a transaction header 210 from the source 204. In response to receiving the transaction header 210, the memory controller 114 adds the transaction header 210 to the transaction header buffer 120, as indicated by the buffer transaction header 212 operation block. In the illustrated example of FIG. 2, the transaction header 210 is associated with priority information that is of an equal priority or a lower priority than priority information for the transaction header 206. Thus, the transaction header 206 is prioritized in the transaction header buffer 120 for servicing before the transaction header 210 due to being first received by the memory controller 114, due to having a higher associated priority, or a combination thereof.

The memory controller 114 is depicted as sending an acknowledgement message ("ACK"), represented by ACK 214, to the source 202. The ACK 214 is representative of the memory controller 114 granting a transaction as indicated by the transaction header 206 that the source 202 requests be processed by the processing-in-memory component 112. The memory controller 114 generating the ACK 214 is thus representative of an instance of the memory controller 114 generating a transaction grant 122 for the transaction header 116.

The memory controller 114 is further depicted as sending a negative acknowledgment message ("NACK"), represented by NACK 216, to the source 204. The NACK 216 is representative of the memory controller 114 identifying that a conflicting transaction (e.g., a transaction requested by the transaction header 206) is currently being processed, or is scheduled for processing, by the processing-in-memory component 112. Alternatively or additionally, the NACK 216 is representative of the memory controller 114 identifying that the processing-in-memory component 112 does not have sufficient resources to process the transaction requested by the transaction header 210 (e.g., the processing-in-memory component 112 does not have sufficient slots in the operation queue 124 to enqueue one or more operations of the transaction requested by the transaction header 210).

Upon receipt of the ACK 214, the source 202 is depicted as communicating the transaction operations 218 to the memory controller 114. The transaction operations 218 are representative of one or more operations that are performed sequentially by the processing-in-memory component 112 using data stored in memory 110, where a number of the one or more operations and address data for the data stored in memory 110 are described by the transaction header 206. The memory controller 114 is depicted as routing the transaction operations 218 from the source 202 to the processing-in-memory component 112 for processing. In response to routing the transaction operations 218 to the processing-in-memory component 112, the memory controller 114 is further configured to remove the transaction header 206 from the transaction header buffer 120. For instance, in an example implementation the memory controller 114 alters a "ready" bit value in the transaction header 206 to indicate that a transaction requested by the transaction header 206 has been granted and sent for processing by the processing-in-memory component 112. In this example implementation, other transaction headers in the transaction header buffer 120 that have yet to be sent for processing by the processing-in-memory component 112 include respective "ready" bit values indicating that the respective requested transactions have yet to be granted by the memory controller 114.

Upon receipt of the transaction operations 218, the processing-in-memory component 112 is configured to execute operations 220 of the one or more operations represented by the transaction operations 218. In one or more implementations, the processing-in-memory component 112 executes the operations represented by the transaction operations 218 atomically, such that the processing-in-memory component 112 processes the transaction operations 218 sequentially using data located at one or more addresses in memory 110 specified by the transaction header 206 without interruption (e.g., independent of interleaving execution of an operation not included in the transaction operations 218). The processing-in-memory component 112 is further configured to output a result 222 as part of executing the transaction operations 218. For instance, the processing-in-memory component 112 generates and outputs result 126 as part of executing the transaction operations 218.

In some implementations, the processing-in-memory component 112 is configured to output the result 222 by storing the result 126 in a storage location of memory 110. Alternatively or additionally, the processing-in-memory component 112 is configured to store result 126 locally (e.g., in one or more registers of the processing-in-memory component 112). Alternatively or additionally, in some implementations the processing-in-memory component 112 is configured to output the result 126 to a processing device, such as a requesting source for the transaction (e.g., source 202). Alternatively or additionally, in some implementations the processing-in-memory component 112 outputs the result 126 to a processing device other than a requesting source for a transaction, such as to source 204, to host 102, combinations thereof, and so forth.

In response to detecting that granting the transaction request represented by the transaction header 210 will no longer cause a conflict, the memory controller 114 sends an ACK 224 to the source 204 that grants the transaction request represented by the transaction header 210. In implementations, the memory controller 114 is configured to grant the transaction request represented by the transaction header 210 in response to identifying that the processing-in-memory component 112 has completed executing the transaction operations 218, in response to identifying that the processing-in-memory component 112 will be completed with executing the transaction operations 218 before processing the transaction represented by transaction header 210, in response to identifying that the processing-in-memory component 112 has sufficient resources to enqueue operations of the transaction represented by the transaction header 210, combinations thereof, and so forth.

Upon receiving the ACK 224, the source 204 communicates the transaction operations 226 to the processing-in-memory component 112. In the illustrated example of FIG. 2, the source 204 communicates the transaction operations 226 directly to the processing-in-memory component 112 (e.g., independent of routing one or more of the transaction operations 226 to the processing-in-memory component 112 via the memory controller 114). The transaction operations 226 are representative of one or more operations that are performed sequentially by the processing-in-memory component 112 using data stored in memory 110, where a number of the one or more operations and address data for the data stored in memory 110 are described by the transaction header 210. In response to sending the ACK 224 (e.g., after sending the ACK 224, in response to receiving confirmation from the source 204 of receiving the ACK 224 or transmitting the transaction operations 226 to the processing-in-memory component 112, in response to receiving confirmation from the processing-in-memory component 112 of receiving the transaction operations 226, or combinations thereof), the memory controller 114 clears the transaction header 210 from the transaction header buffer 120.

Upon receipt of the transaction operations 226, the processing-in-memory component 112 is configured to execute operations 228 of the one or more operations represented by the transaction operations 226. In one or more implementations, the processing-in-memory component 112 executes the operations represented by the transaction operations 226 atomically, such that the processing-in-memory component 112 processes the transaction operations 226 sequentially using data located at one or more addresses in memory 110 specified by the transaction header 210 without interruption (e.g., independent of interleaving execution of an operation not included in the transaction operations 226). The processing-in-memory component 112 is further configured to output a result 230 as part of executing the transaction operations 226. For instance, the processing-in-memory component 112 generates and outputs result 126 as part of executing the transaction operations 226.

In some implementations, the processing-in-memory component 112 is configured to output the result 230 by storing the result 126 in a storage location of memory 110. Alternatively or additionally, the processing-in-memory component 112 is configured to store result 126 locally (e.g., in one or more registers of the processing-in-memory component 112). Alternatively or additionally, in some implementations the processing-in-memory component 112 is configured to output the result 126 to a processing device, such as a requesting source for the transaction (e.g., source 204). Alternatively or additionally, in some implementations the processing-in-memory component 112 outputs the result 126 to a processing device other than a requesting source for a transaction, such as to source 202, to host 102, combinations thereof, and so forth.

The memory controller 114 is thus configured to efficiently schedule conflict-free processing of source-requested transactions for execution by the processing-in-memory component 112. Advantageously, the techniques described herein enable the memory controller 114 to schedule PIM transactions without implementing locks in memory 110 or requiring that the requesting sources send more than one request for a given transaction, even in scenarios where the memory controller 114 sends a NACK and buffers a transaction request for subsequent processing, which is not enabled by conventional system architectures.

Figure 3:
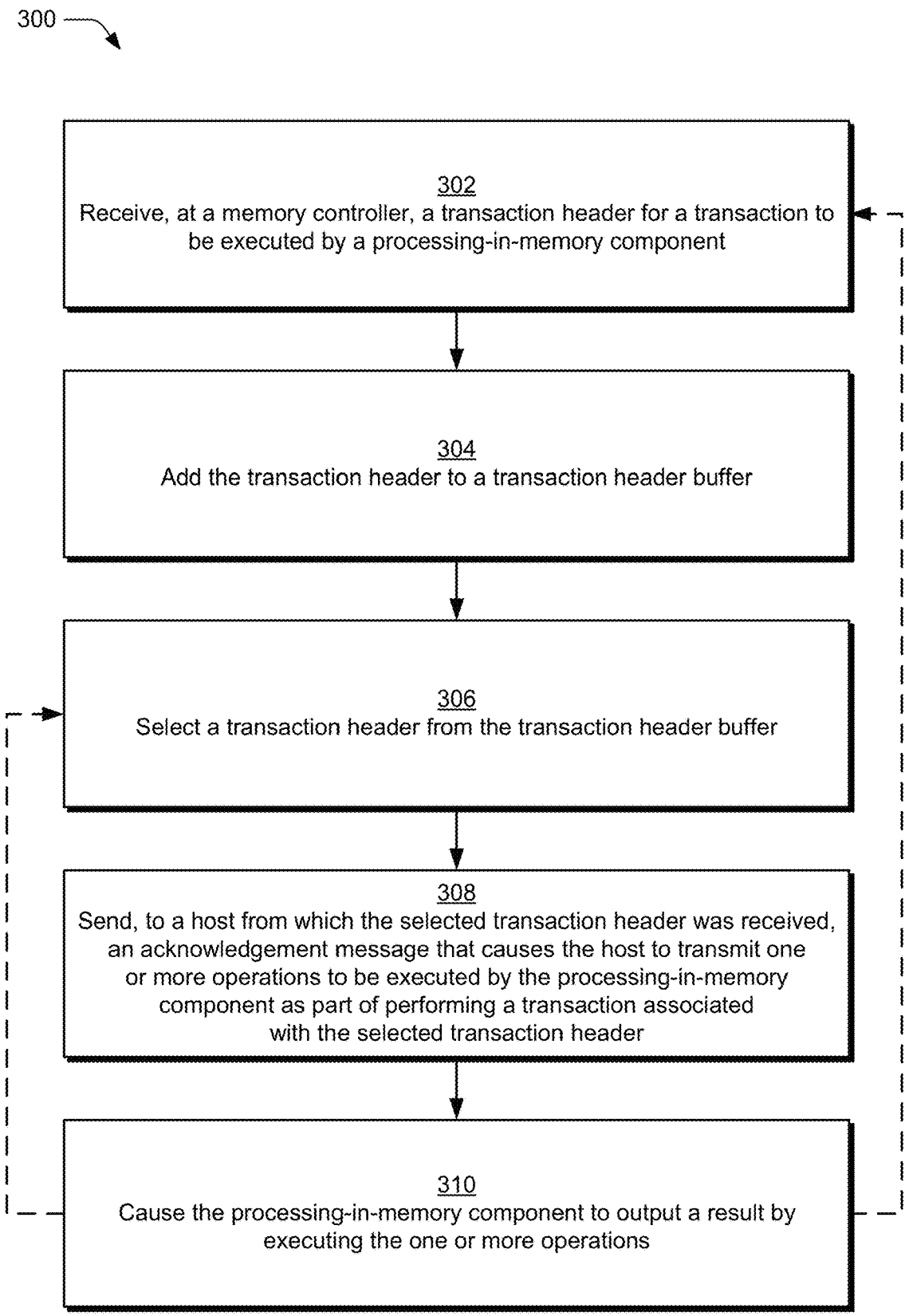
FIG. 3 depicts a procedure in an example implementation of scheduling processing-in-memory transactions.

FIG. 3 depicts a procedure 300 in an example implementation of scheduling processing-in-memory transactions.

A transaction header for a transaction to be executed by a processing-in-memory component is received at a memory controller (block 302). The memory controller 114, for instance, receives transaction header 116 from host 102. The transaction header is added to a transaction header buffer (block 304). The memory controller 114, for instance, adds the transaction header 116 to the transaction header buffer 120.

A transaction header is then selected from the transaction header buffer (block 306). The memory controller 114, for instance, identifies a highest priority transaction header maintained in the transaction header buffer 120. In some implementations, the memory controller 114 selects a transaction header from the transaction header buffer 120 in response to detecting that the processing-in-memory component 112 is able to handle processing of a requested transaction associated with the selected transaction header. For instance, in some implementations the memory controller 114 refrains from selecting a higher-priority transaction header from the transaction header buffer 120 and instead selects a lower-priority transaction header responsive to identifying that the processing-in-memory component 112 is currently executing an operation using data stored at a memory address that is also needed to process the transaction associated with the higher-priority transaction header but not scheduled to use data stored at a memory address needed to process the transaction identified by the lower-priority transaction header. The memory controller 114 thus selects a transaction header from the transaction header buffer 120 in a manner that eagerly schedules PIM transactions without conflict.

After selecting the transaction header, an acknowledgement message is sent to a host from which the selected transaction header was received, where the acknowledgement message causes the host to transmit one or more operations to be executed by the processing-in-memory component as part of performing a transaction associated with the selected transaction header (block 308). The memory controller 114, for instance, transmits ACK 214 to the source 202, which causes the source 202 to send transaction operations 218 associated with the transaction header 206 for processing by the processing-in-memory component 112.

The processing-in-memory component is then caused to output a result by executing the one or more operations (block 310). The processing-in-memory component 112, for instance, atomically executes the transaction operations 218 and outputs result 126. In one example, the processing-in-memory component 112 outputs the result 126 to the host 102. Alternatively or additionally, the processing-in-memory component 112 stores the result 126 for subsequent access (e.g., in memory 110 and/or locally in one or more registers of the processing-in-memory component 112 for subsequent access by the processing-in-memory component 112, the host 102, and so forth).

Performance of the operations depicted in the procedure 300 is configured to continue for servicing additional PIM transaction requests, as indicated by the dotted arrows returning to block 302 and block 304 from block 310. In some implementations, performance of operations represented by different blocks of procedure 300 is performed simultaneously. For instance, the memory controller 114 is configured to simultaneously perform operations described in block 308 and block 310 while also performing block 302 (e.g., for an additional transaction header received while performing operations of block 308 and block 310 for a previously received transaction header).

Figure 4:
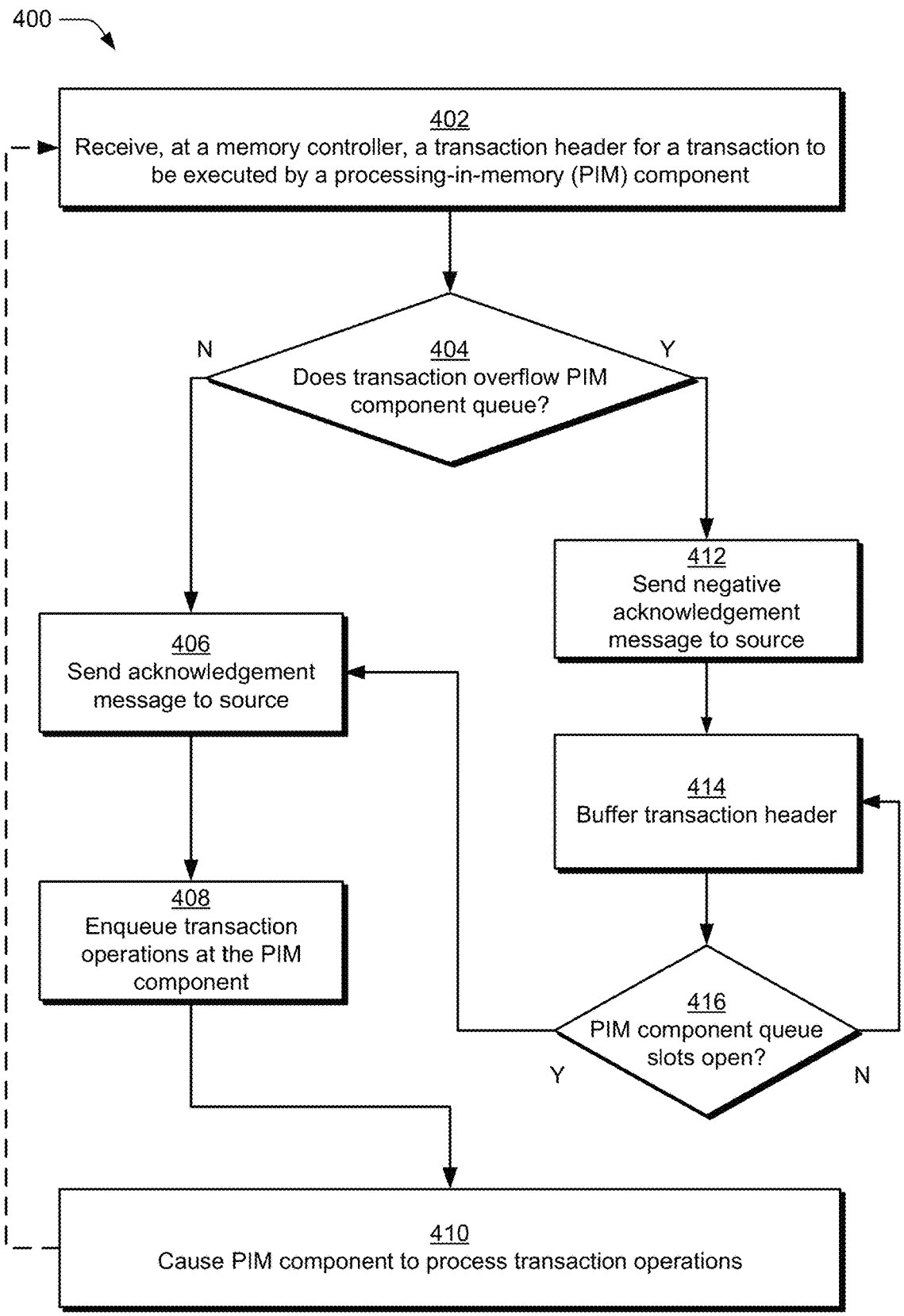
FIG. 4 depicts a procedure in an additional example implementation of scheduling processing-in-memory transactions.

FIG. 4 depicts a procedure 400 in an example implementation of scheduling processing-in-memory transactions.

A transaction header for a transaction to be executed by a processing-in-memory component is received at a memory controller (block 402). The memory controller 114, for instance, receives transaction header 116 from host 102. A determination is made as to whether the transaction overflows a PIM component queue (block 404). The memory controller 114, for instance, identifies a number of transaction operations described by the transaction header 116 and compares the number of transaction operations to a number of open slots in the operation queue 124 of the processing-in-memory component 112.

In response to determining that the transaction does not overflow the PIM component queue (e.g., "No"), an acknowledgement message is sent to a source (block 406). The memory controller 114, for instance, sends ACK 214 to the source 202 in response to detecting that a number of transaction operations specified by the transaction header 206 do not exceed a number of open slots in the operation queue 124 of the processing-in-memory component 112. After sending the acknowledgment message to the source, the transaction operations are enqueued at the PIM component (block 408). The memory controller 114, for instance, receives the transaction operations 218 from the source 202 and inputs the transaction operations 218 to the operation queue 124. Alternatively or additionally, the memory controller 114 instructs the source 202 to transmit one or more of the transaction operations 218 directly to the processing-in-memory component 112 for enqueuing at the operation queue 124.

The PIM component is then caused to process the transaction operations (block 410). The processing-in-memory component 112, for instance, is configured to process transaction operations enqueued at the operation queue 124 based on an order in which the transaction operations are enqueued (e.g., sequentially and without interruption by executing an operation out of order relative to a queue order).

Alternatively, returning to block 404, in response to detecting that the transaction overflows the PIM component queue (e.g., "Yes"), a negative acknowledgement message is sent to the source (block 412). The memory controller 114, for instance, sends NACK 216 to the source 204 in response to detecting that the processing-in-memory component 112 has insufficient resources to enqueue and/or execute the transaction operations 226. Alternatively or additionally, the memory controller 114 sends NACK 216 to the source 204 in response to detecting that granting a request for the processing-in-memory component 112 to perform the transaction associated with the transaction header 210 would result in a conflict (e.g., would result in the processing-in-memory component 112 attempting to execute different transactions involving data stored in at least one common address of the memory 110).

In implementations, the negative acknowledgement message is generated in a manner that instructs the source to refrain from subsequently requesting that the processing-in-memory component 112 perform the requested transaction. For instance, the memory controller 114 generates the NACK 216 to instruct the source 204 to not send another request (e.g., another instance of the transaction header 210). In such an example instance, the memory controller 114 ensures that the transaction requested by the transaction header 210 is not aborted by the source 204 despite not receiving an acknowledgement message in response to transmitting the transaction header 210 to the memory controller 114 (e.g., the NACK 216 indicates that the transaction header 210 is received by the memory controller 114 and that the memory controller 114 will send ACK 224 to the source 204 when the processing-in-memory component 112 is able to service the transaction request associated with the transaction header 210).

In addition to sending the negative acknowledgment message to the source, the transaction header is buffered (block 414). The memory controller 114, for instance, adds the transaction header 210 to the transaction header buffer 120. In some implementations, performance of block 414 (e.g., buffering the transaction header) is optional. For instance, in an example implementation the memory controller 114 computes a retry interval for the transaction header and includes the retry interval in the negative acknowledgement message. In such an example implementation, the retry interval instructs the source 204 to resubmit the transaction header 210 to the memory controller 114 after a duration described by the retry interval.

In implementations where the memory controller 114 buffers the transaction header, the memory controller 114 monitors the PIM component to determine whether one or more queue slots open (block 416). The memory controller 114, for instance, monitors the operation queue 124 and detects when one or more slots in the operation queue 124 are available to enqueue operations associated with the received transaction header. In response to detecting that the processing-in-memory component 112 is unable to execute one or more operations of a transaction (e.g., responsive to a "No" determination due to a memory location conflict or due to the operation queue 124 overflowing), the transaction header is maintained in the transaction header buffer 120, as indicated by the arrow returning to block 414 form the block 416.

Alternatively, in response to detecting that the processing-in-memory component 112 is able to execute one or more operations of the requested transaction (e.g., responsive to a "Yes" determination due to no memory location conflicts or due to sufficient space available in the operation queue 124), the procedure 400 proceeds from block 416 to block 406, where an acknowledgment message is sent to a source identified by a source identifier in the previously buffered transaction header.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108, the memory module 104 having the memory 110 and the processing-in-memory component 112, and the memory controller 114 having the scheduling module 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   a memory of a memory module;
   a processing-in-memory component of the memory module; and
   a memory controller disposed outside the memory module, the memory controller including a transaction header buffer and configured to:
   receive a transaction header, from a host, for a transaction to be executed by the processing-in-memory component using data stored in the memory;
   add the transaction header to the transaction header buffer; and
   send an acknowledgement message to the host responsive to detecting that scheduling the transaction does not conflict with a different transaction based on information stored in the transaction header buffer; or
   send a negative acknowledgment message to the host responsive to detecting that scheduling the transaction conflicts with the different transaction, based on information stored in the transaction header buffer.

2. The system of claim 1, wherein the transaction header describes a number of operations of the transaction to be executed by the processing-in-memory component.

3. The system of claim 2, wherein execution of the transaction comprises the processing-in-memory component executing the operations of the transaction sequentially without interruption.

4. The system of claim 1, wherein the transaction header describes priority information for the transaction.

5. The system of claim 1, wherein the transaction header describes one or more addresses in the memory at which the data stored in the memory is located.

6. The system of claim 1, wherein the transaction header describes a task identifier associated with the transaction and a source identifier associated with the host.

7. The system of claim 1, wherein the transaction header buffer comprises a buffer maintained at the memory controller.

8. The system of claim 1, wherein the transaction header buffer comprises a buffer maintained in the memory of the memory module.

9. The system of claim 1, wherein the memory controller is implemented in the host and the transaction header is received from a core of the host.

10. The system of claim 1, wherein the acknowledgement message causes the host to send operations of the transaction to the memory controller for routing to the processing-in-memory component.

11. The system of claim 1, wherein the acknowledgement message causes the host to send operations of the transaction directly to the processing-in-memory component.

12. The system of claim 1, wherein the memory controller is configured to send the acknowledgement message to the host in response to identifying that the processing-in-memory component is not scheduled to execute one or more operations using data stored in memory at an address associated with the transaction.

13. The system of claim 1, wherein the memory controller is configured to send the acknowledgment message to the host in response to identifying that an operation queue of the processing-in-memory component has space to queue operations of the transaction.

14. The system of claim 1, wherein the memory controller is configured to send the negative acknowledgment message to the host with a retry interval that indicates an amount of time to wait before subsequently requesting that the transaction be executed by the processing-in-memory component.

15. The system of claim 14, wherein the memory controller is configured to compute the retry interval based on a load described by one or more transaction headers maintained in the transaction header buffer.

16. The system of claim 14, wherein the memory controller is configured to compute the retry interval based on a load described by one or more transaction operations enqueued in an operation queue of the processing-in-memory component.

17. The system of claim 1, wherein the negative acknowledgement message causes the host to refrain from sending operations of the transaction for execution by the processing-in-memory component until receiving a subsequent acknowledgement message from the memory controller.

18. The system of claim 1, wherein the acknowledgement message causes the host to send operations of the transaction for execution by the processing-in-memory component without locking one or more locations in the memory of the memory module.

19. A method comprising:
receiving, at a memory controller disposed outside a memory module and from a host processing device, a transaction header for a transaction to be executed by a processing-in-memory component of the memory module, the transaction header describing a number of operations involved in executing the transaction;
maintaining, by the memory controller, the transaction header in a buffer of the memory controller; and
sending, by the memory controller, an acknowledgment message to the host processing device responsive to determining, based on the transaction header maintained in the buffer of the memory controller, that a number of open spaces in an operation queue of the processing-in-memory component can fit the number of operations involved in executing the transaction.

20. A system comprising:
a memory of a memory module;
a processing-in-memory component of the memory module; and
a memory controller disposed outside the memory module, the memory controller configured to:
receive a transaction header, from a host, for a transaction to be executed by the processing-in-memory component using data stored in the memory and add the transaction header to a transaction header buffer;
compute a retry interval based on a current load of the processing-in-memory component; and
send a negative acknowledgement message to the host that includes the retry interval in response to detecting that scheduling the transaction conflicts with a different transaction, based on information stored in the transaction header buffer.

* * * * *